(12) United States Patent
Kuchly et al.

(10) Patent No.: US 10,710,655 B2
(45) Date of Patent: Jul. 14, 2020

(54) WIPER LINKAGE SUB-ASSEMBLY AND LINKAGE BLOCKED IN A POSITION FOR TRANSPORT BY MEANS OF A BLOCKING ELEMENT, AND METHOD FOR BLOCKING A WIPER LINKAGE BY WAY OF A BLOCKING ELEMENT

(71) Applicant: Valeo Systèmes d'Essuyage, Le Mesnil Saint Denis (FR)

(72) Inventors: Nicholas Kuchly, Issoire (FR); Pascal Renoux, Issoire (FR); Frédéric Baud, Issoire (FR); Robin Viard, Issoire (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 156 days.

(21) Appl. No.: 15/997,151

(22) Filed: Jun. 4, 2018

(65) Prior Publication Data

US 2018/0346045 A1     Dec. 6, 2018

(30) Foreign Application Priority Data

Jun. 5, 2017    (FR) ..................................... 17 54970

(51) Int. Cl.
     *B60S 1/24*          (2006.01)
     *B62D 65/02*       (2006.01)
     (Continued)

(52) U.S. Cl.
     CPC ............ *B62D 65/022* (2013.01); *B60S 1/045* (2013.01); *B60S 1/245* (2013.01); *F16H 21/40* (2013.01)

(58) Field of Classification Search
     CPC ........ B62D 65/022; B60S 1/045; B60S 1/245; B60S 1/043; B60S 1/0433; B60S 1/24;
     (Continued)

(56) References Cited

U.S. PATENT DOCUMENTS

2018/0022319 A1*   1/2018   Hawighorst ............ B60S 1/043
                                                                          15/250.34
2018/0345914 A1*   12/2018   Renoux ................. B60S 1/3493
                (Continued)

FOREIGN PATENT DOCUMENTS

DE           10313540 A1    10/2004
DE     102015219853 A1    4/2017
FR            2972163 A1     9/2012

OTHER PUBLICATIONS

Preliminary Search Report and Written Opinion issued in corresponding French Patent Application No. 1754970, dated Feb. 14, 2018 (6 pages).

*Primary Examiner* — David H Bollinger
(74) *Attorney, Agent, or Firm* — Osha Liang LLP

(57) ABSTRACT

The present invention consists in a subassembly (1) of a linkage (2) of a wiper mechanism comprising:
   a bearing (3),
   a crank (5) articulated on the bearing (3) having a first end (51) connected to the bearing (3) and a second end (53) including a ball joint (7), and
   a link (9) one end of which is connected by the ball joint (7) to the crank (5), characterized in that at least the crank (5) includes a first through-opening and in that the subassembly (1) comprises a locking element (11) intended to be positioned in the first through-opening and configured to block relative movement between the link (9) and the crank (5).

13 Claims, 1 Drawing Sheet

Figure 1:
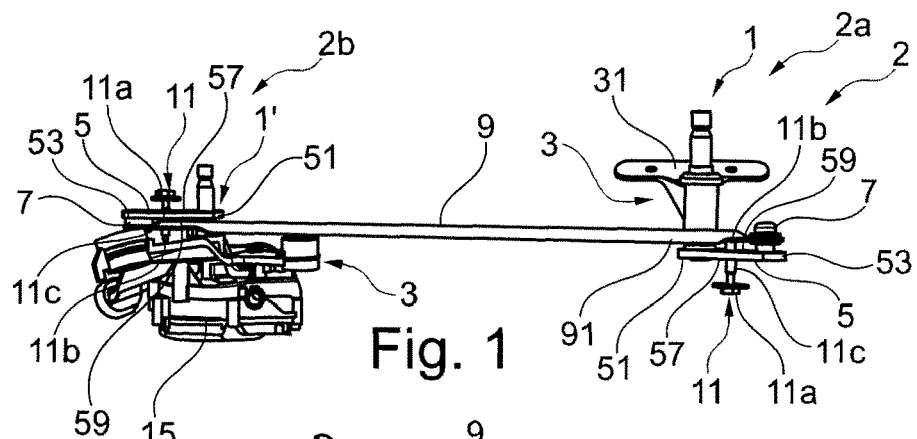

(51) Int. Cl.
*F16H 21/40* (2006.01)
*B60S 1/04* (2006.01)

(58) Field of Classification Search
CPC .......... F16H 21/40; F16H 21/18; F16H 21/24; F16H 21/28
USPC ...................................................... 74/47, 48
See application file for complete search history.

(56) References Cited

U.S. PATENT DOCUMENTS

2018/0346043 A1\* 12/2018 Viard ................... B62D 65/022
2018/0346044 A1\* 12/2018 Kuchly ................... B60S 1/045

\* cited by examiner

WIPER LINKAGE SUB-ASSEMBLY AND LINKAGE BLOCKED IN A POSITION FOR TRANSPORT BY MEANS OF A BLOCKING ELEMENT, AND METHOD FOR BLOCKING A WIPER LINKAGE BY WAY OF A BLOCKING ELEMENT

FIELD OF THE INVENTION

The present invention relates to the field of the linkages of wiper mechanisms, in particular for motor vehicles, and more particularly to locking the linkages in a transport position. The present invention relates more specifically to a subassembly of a linkage and to a linkage comprising at least one crank and at least one link locked in a transport position with the aid of a locking element. The present invention also relates to a method of locking the subassembly with the aid of the locking element in order to retain the linkage in its transport position.

BACKGROUND OF THE INVENTION

Motor vehicle wiper mechanism linkages are systems articulated at various locations. This articulation is necessary for the correct functioning of the wiper system once the linkage has been installed on the motor vehicle. However, this kind of articulation causes problems in particular for transporting the linkage and for installing it on the motor vehicle. Accordingly, it is necessary to limit the degrees of freedom of the linkage both during transport and during installation thereof.

There are known locking elements enabling connection of the link to bearings enabling fixing of the linkage to the motor vehicle so that the linkage is in a transport position. The known prior art locking elements can take various forms, such as a clamp form, for example, in order to lock the linkage in a transport and installation position, that is to say a position in which all movement of a bearing of the linkage relative to the link is prevented.

However, the locking elements described in this document are for single use and are removed by cutting, for example after installation of the linkage on the motor vehicle. Accordingly, it is necessary to use tools, generally cutting tools, in order to be able to release the linkage. Moreover, this kind of locking element produces debris that it will be necessary to process afterwards, which generates additional costs.

An object of the present invention is to alleviate at least partly the disadvantages of the prior art described above.

Another objective of the present invention, different from the preceding objective, is to propose a locking element that can remain on the linkage of the wiper mechanism once the latter has been installed so as to reduce the production of waste to be processed.

Another objective of the present invention, different from the preceding objectives, is to propose a locking element that is simple to install on a linkage of a wiper mechanism.

A further objective of the present invention, different from the preceding objectives, is to propose a locking element that enables simple release of the linkage of the wiper mechanism.

BRIEF SUMMARY OF THE INVENTION

To this end, in order to achieve at least one of the aforementioned objectives at least partially, the present invention consists in a subassembly of a linkage of a wiper mechanism comprising:

- a bearing,
- a crank articulated on the bearing having a first end connected to the bearing and a second end including a ball joint enabling the articulation of a link, and
- a link one end of which is connected by the ball joint to the crank, at least the crank including a first through-opening and the subassembly comprising a locking element intended to be positioned in the first through-opening and configured to block the relative movement between the link and the crank.

The locking element locks the linkage subassembly in the transport position by locking the position of the link relative to the first end of the crank. Installing the locking element is advantageously simple and easy. Moreover, the release of the linkage subassembly is also simple and easy.

The linkage subassembly may further include one or more of the following features separately or in combination.

The first through-opening has a circular shape and the locking element has a cylindrical shape.

According to one aspect, the locking element corresponds to a locking screw, the locking element having a first end including a screw head, a free second end, and an externally threaded cylindrical shaft connecting the first end and the second end.

According to a first variant, the second end of the locking element comes into contact with a face of the link disposed facing the crank when the subassembly is in the transport position.

According to the first variant, the link corresponds to a U-section and the second end of the locking element comes to be housed inside the U-section when the subassembly is in its transport position.

According to a first aspect, the first through-opening is internally threaded so as to cooperate with the externally threaded cylindrical shaft of the locking element.

According to another aspect, the link has inside the U-section a shape complementary to the second end of the locking element, said complementary shape being intended to cooperate with the free second end of the locking element, said complementary shape preferably being internally threaded in order to hold the linkage subassembly in place in its transport position.

At least the first through-opening of circular shape has a diameter identical to the diameter of the openings for fixing the bearing onto the motor vehicle.

According to a second variant, the second end of the locking element passes through a second, notably circular, through-opening in the link when the linkage subassembly is in the transport position.

According to one aspect, the first through-opening of the crank is internally threaded According to another aspect, the second through-opening in the link is internally threaded.

According to a further aspect, the linkage subassembly further includes a nut for locking the second end of the locking element, said locking nut being intended to be fixed at the second end of the locking element passing through the link so as to hold the linkage subassembly in place in its transport position.

According to the third embodiment, the locking screw corresponds to a bolt or to a nut with fins.

The present invention also consists in a linkage of a wiper mechanism comprising a first subassembly and a second subassembly interconnected by a link, the first subassembly and/or the second subassembly is a subassembly as defined above and the first subassembly and/or the second subassembly is adapted to be locked in the transport position of the linkage with the aid of the locking element.

The locking of the first and/or second subassembly in the transport position of the linkage is reversible.

According to one aspect, the first and second subassemblies include at least one locking element maintaining the position of the link fixed relative to the first end of the crank carried by the subassembly.

According to this aspect, the locking elements correspond to locking screws.

The linkage further comprises a motor connected to at least one crank, said motor being configured to enable movement in translation of the link.

The motor of the linkage is installed on the second side of the linkage.

The present invention also consists in a method as defined above of locking a link and a crank of a linkage subassembly in a transport position, the method comprising at least one of the following steps:

- inserting the locking element in the crank so that the first end faces a face of the crank opposite that facing the link,
- rotating the link about the ball joint so as to move the linkage into the transport position, and
- positioning the locking element, notably by screwing, so that the free second end is at least in contact with the link.

The locking element is preferably a locking screw.

According to one embodiment, the step of positioning the locking element is effected by screwing into the crank, the first through-opening of which is internally threaded.

According to one particular embodiment, the linkage is released by unscrewing the locking element.

The locking elements are advantageously configured to cooperate with openings in the bearing and in an element of the motor vehicle in order to fix the linkage to the motor vehicle.

The locking elements may be installed on the first side or on the second side of the linkage.

DRAWINGS

Figure 2:
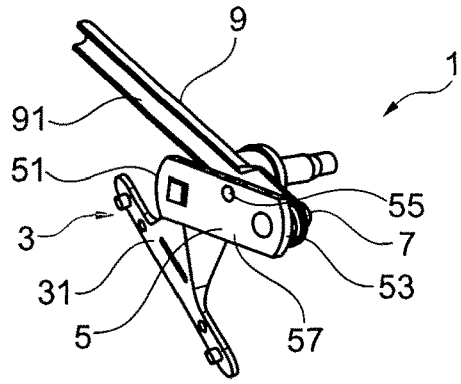
Figure 3:
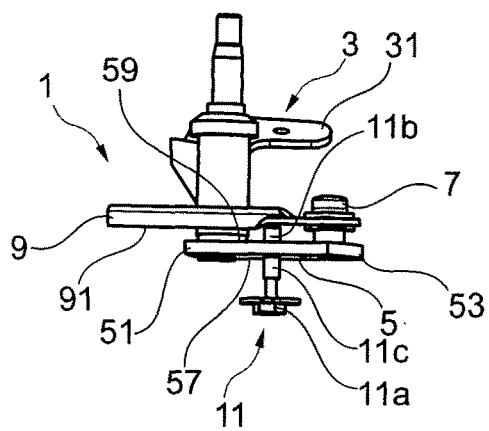
Figure 4:
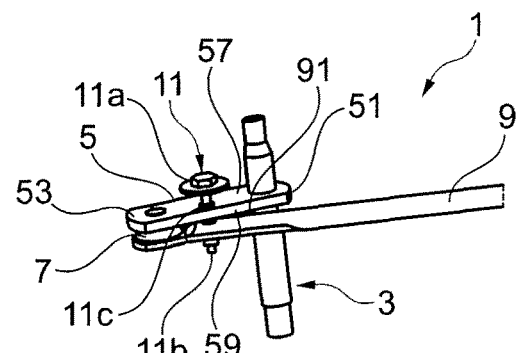
Figure 5:
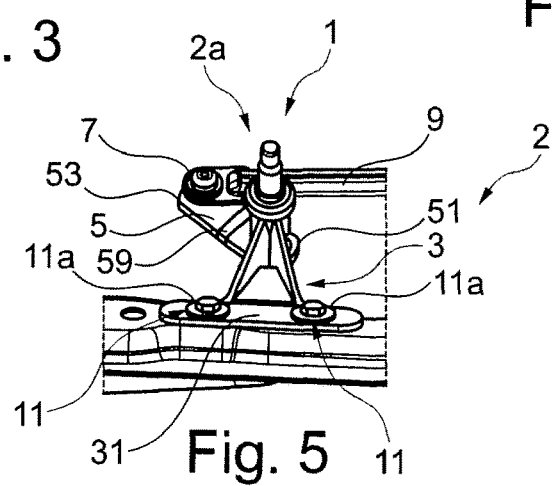

Other advantages and features of the present invention will become more clearly apparent on reading the following description given by way of nonlimiting illustration and from the appended drawings, in which:

FIG. 1 is a diagrammatic perspective view of a linkage of a wiper mechanism blocked in a transport position with the aid of locking elements according to the present invention, FIG. 2 is a diagrammatic perspective view of a linkage subassembly showing a crank in more detail, FIG. 3 is a diagrammatic perspective view of a linkage subassembly according to a first embodiment locked in the transport position, FIG. 4 is a diagrammatic perspective view of a linkage subassembly according to a second embodiment locked in the transport position, and FIG. 5 is a diagrammatic partial perspective view of a linkage installed on a motor vehicle.

DETAILED DESCRIPTION OF THE INVENTION

In these figures, identical elements bear the same reference numbers.

The following embodiments are examples. Although the description refers to one or more embodiments, does not necessarily mean that each reference concerns the same embodiment or that the features apply only to only one embodiment. Single features of different embodiments may equally be combined or interchanged to produce other embodiments.

The following description refers to a first and to a second side of the linkage, to a first and to a second linkage subassembly, to a first and to a second end of the crank, to a first and to a second surface of the crank, and to a first and to a second through-opening. This is merely indexing to differentiate and to designate elements that are close but not identical. This indexing does not imply any priority of one element over another and such designations may easily be interchanged without departing from the scope of the present description. Nor does this indexing imply an order in time, for example to assess the disposition of the linkage on the motor vehicle, its operation, or again its installation, or again to appreciate the installation of the locking element on the linkage in order to retain the latter in its transport position.

In the following description, there is meant in particular by "transport position" a position in which at least one end of the link and a crank to which that end of the link is connected form a minimum angle. To be more precise, at least this end of the link is in a position close to the bearing on which the crank is articulated so that the linkage has a minimum overall size when it is in the transport position. The definition of this "transport position" applies equally to the linkage and to the linkage subassembly.

Referring to FIGS. 1 and 2, there is shown a linkage 2 of a wiper mechanism reversibly locked in a transport position with the aid of at least one locking element 11. The linkage 2 comprises a first subassembly 1 disposed on a first side 2*a* of the linkage 2, a second subassembly 1' disposed on a second side 2*b* of the linkage 2, and a motor 15. The first subassembly 1 and the second subassembly 1' are interconnected by a link 9. Moreover, the motor 15 of the linkage 2 is installed from the second side 2*b* of the linkage 2. The second side 2*b* of the linkage 2 generally corresponds to the driver side of the motor vehicle in the mounted state of the linkage 2 on the motor vehicle. According to a variant, the second side 2*b* may correspond to the passenger side of the motor vehicle once the linkage 2 is installed on the latter.

The first subassembly 1 and the second subassembly 1' comprise a bearing 3 and a crank 5 articulated on the bearing 3. The motor 15 is connected to at least one crank 5, notably to the crank 5 carried by the second subassembly 1, and is configured to enable movement in translation of the link 9.

The crank 5 has a first end 51 connected to the bearing 3, for example by a pivot connection, and a second end 53 including a ball joint 7 connected to one end of the link 9 in order to enable articulation of the link 9 on the crank 5. Moreover, the crank 5 includes a first through-opening 55 (visible in FIG. 2). The locking element 11 is intended to be positioned in the first through-opening 55.

The locking element 11 is configured to lock reversibly the relative movement between the link 9 and the crank 5, and to be more precise the first end 51 of the crank 5, in order to retain at least the first subassembly 1 in the transport position. The locking element 11 has a cylindrical shape and may correspond to a locking screw. The locking element 11 has for example a first end 11*a* including a screw head, a free second end 11*b*, and an externally threaded cylindrical shaft 11*c* connecting the first end 11*a* and the second end 11*b*. The second end 11*b* is intended to cooperate with the link 9 in order to lock it when the linkage 2 is in the transport position. According to the particular embodiment shown here, the first end 11*a* includes a screw head having a shape enabling the locking element 11 to be fitted, for example by screwing it on, and removed. The fitting and the removal of the locking element 11 may be effected with or without tools. If the use of a tool is required, the first end 11a has a shape intended to cooperate with the tool, which may for example be a wrench or there again a screwdriver.

Moreover, according to the particular embodiment described here, the cylindrical shaft 11c may have dimensions such as a length and a diameter intended to cooperate with openings on the motor vehicle in order to fix the linkage 2 to the latter. This advantageously makes it possible to limit the production of waste linked to the installation of the linkage 2 on the motor vehicle because the locking element 11 can therefore be recycled.

Referring to FIG. 2, there is shown the free first subassembly 1, meaning that it does not include the locking element 11. The first through-opening 55 has a circular shape in order to enable the locking element 11, and more particularly the cylindrical shaft 11a, to pass through it. On the other hand, in order to limit the parts necessary for fitting the locking element 11, the perimeter of the first through-opening 55 may be internally threaded in order to cooperate with the external thread of the cylindrical shaft 11c of the locking element 11. Thus the locking element 11 is fitted in the crank 5 by screwing it on and the use of a bolt for example intended to cooperate with the second end 11b of the locking element 11 is not necessary. According to the particular embodiment shown here, at least the first through-opening 55 of circular shape has a diameter identical to the diameter of the openings for fixing the bearing 3, and in particular a plate 31 of the bearing 3, to the motor vehicle.

Moreover, according to this particular embodiment, the link 9 takes the form of a U-section having an open face 91 disposed facing the crank 5 of the first subassembly 1. The second end 11b of the locking element 11 is intended to be inserted in the open face 91 so as to retain the linkage 2 in its transport position.

According to the particular embodiment from FIG. 1, the first subassembly 1 and the second subassembly 1' each include a locking element 11. Accordingly, each end of the link 9 is held fixed relative to the first end 51 of each crank 5 of the first subassembly 1 and the second subassembly 1'. Because of this, transporting the linkage 2 is facilitated because degrees of freedom of movement of some parts of the linkage 2 are eliminated. On the other hand, transporting the linkage 2 is also facilitated because it is locked in a position having a minimum overall size. Moreover, the various articulations of the link 9 relative to the crank 5 are locked, which also makes it possible to facilitate installing the linkage 2 on the motor vehicle.

According to other embodiments not shown here, it is possible for only the first subassembly 1 or the second subassembly 1' to include the locking element 11. Accordingly, only one end of the link 9, corresponding to the end connected to the subassembly 1, 1' including the locking element 11, is retained in the transport position of the linkage.

Moreover, according to the particular embodiment from FIG. 1, the link 9 corresponds to a U-section. The crank 5 of the first subassembly 1 is disposed facing the open face 91 and the crank 5 of the second subassembly 1' is disposed facing the face opposite the open face 91. The crank 5 of the first subassembly 1 is therefore disposed under the link 9 and the crank 5 of the second subassembly 1' is disposed over the link 9.

According to other embodiments not shown here, the cranks 5 of the first subassembly 1 and the second subassembly 1' may both be disposed above or below the link 9.

Referring to FIG. 3, there is shown in the transport position the first subassembly 1 according to a first particular embodiment. According to this first embodiment, the link 9 corresponds to a U-section and the open face 91 of the link is disposed facing the crank 5.

The locking element 11 passes through the first through-opening 55 and the second end 11b of the locking element 11 comes into contact with the open face 91 of the link 9. The first through-opening 55 is internally threaded so as to cooperate with the externally threaded cylindrical shaft 11c of the locking element 11 in order to retain it in place during transport. In order to limit the possibilities of movement of the link 9 when the first subassembly 1 is locked in its transport position, the interior of the U-section has a complementary shape to the second end 11b of the locking element 11. This complementary shape is intended to cooperate with the free second end 11b of the locking element 11 in order to hold the locking element 11 in place when the first subassembly 1 is in the transport position of the linkage 2.

According to one particular embodiment not shown here, the complementary shape carried by the U-section of the link 9 is preferably internally threaded so as to cooperate with the second end 11b of the locking element 11 in order to hold the first subassembly 1 in place in its transport position. According to this particular embodiment, the internal thread of the first through-opening 55 may not be necessary.

According to this first particular embodiment, holding the locking element 11 in place does not necessitate any additional part because the externally threaded cylindrical shaft 11c cooperates with an internal thread of the first through-opening 55 and/or of the complementary shape disposed in the U-section of the link 9.

Referring to FIG. 4, there is shown the second subassembly 1' according to a second particular embodiment. According to this second embodiment, the link 9 also corresponds to a U-section and the face of the link 9 opposite the open face 91 is disposed facing the crank 5. The locking element 11 passes through the first through-opening 55 and the second end 11b of the locking element 11 passes through a second through-opening in the link 9 when the second subassembly 1' is in the transport position. The second through-opening is preferably circular so as to be able to cooperate with the cylindrical shaft 11c of the locking element 11.

According to a first variant of the second particular embodiment, the first through-opening 55 of the crank 5 is internally threaded. According to the first variant, the locking element 11 is retained in the crank 5 thanks to the internal thread that cooperates with the externally threaded cylindrical shaft 11c in order to retain the second subassembly 1' in the transport position.

According to a second variant of the second particular embodiment, the second through-opening in the link 9 is internally threaded. The locking element 11 is therefore held in place in the second through-opening in the link 9 thanks to the internal thread that cooperates with the externally threaded cylindrical shaft 11c of the locking element 11 in order to hold the second subassembly 1' in place in the transport position.

According to a third variant of the second embodiment not shown here, the second subassembly 1' further includes a nut for locking the second end 11b of the locking element 11. The locking nut is intended to be fixed to the second end 11b of the locking element 11 through the link 9 to hold the second subassembly 1' in place in the transport position. The locking nut may correspond to a bolt or to a finned nut for example.

According to a further variant of the second embodiment not shown here, the first through-opening SS of the crank 5 and the second through-opening of the link 9 may be internally threaded and configured to cooperate with the cylindrical shaft 11c of the locking element 11.

Locking the link 9 and the crank 5 of the first linkage subassembly 1 in the transport position employs a method that comprises various steps.

The method comprises a step a of inserting the locking element 11 in the first through-opening 55 of the crank 5 so that the first end 11a faces a first face 57 of the crank 5 opposite a second face 59 of the crank 5 disposed facing the link 9. The method also comprises a step b of rotating the link 9 about the ball joint 7 so as to bring the linkage 2 into the transport position. The method then comprises a step c of positioning the locking element 11, notably by turning it so that the free second end 11b is at least in contact with the link 9, that is to say so that the second end 11b of the locking element 11 is in contact with the interior surface of the U-section of the link 9 according to the first embodiment (FIG. 3) or that the second end 11b passes through the link 9 according to the second embodiment (FIG. 4). According to different embodiments, the various steps a, b, c may be interchanged.

Moreover, according to the third variant of the second particular embodiment, the method may comprise an additional step d in which the locking nut cooperates with the second end 11b of the locking element 11.

The step c of positioning the locking element 11 is carried out by rotating the first end 11a so that the externally threaded cylindrical shaft 11c cooperates with an internal thread in the first through-opening 55, the second through-opening or the locking nut, therefore holding the locking element 11 in place during transportation or installation of the linkage 2 on the motor vehicle. The first end 11a may be rotated manually or using a tool. When this rotation is intended to be effected with the aid of a tool, the first end 11a of the locking element 11 has a shape intended to cooperate with the tool used to fit the locking element 11.

When the positioning step is effected by screwing the locking element 11 into the internally threaded first through-opening SS, this makes it possible to limit the number of parts to be used for locking the linkage 2 in the transport position. Moreover, such screwing is compatible both with the first particular embodiment and the second particular embodiment described with reference to FIGS. 3 and 4.

Fitting the locking element 11 so as to retain the linkage 2 in its transport position is therefore possible in a simple, easy manner and without necessarily needing tools.

The linkage 2 is released by unscrewing the locking element 11. Unscrewing enables movement of the second end 11b so as to release the link 9. The releasing of the linkage 2 is therefore possible in a simple and easy manner. According to one particular embodiment, unscrewing is effected until the locking element 11 is removed completely from the first subassembly 1 and/or the second subassembly 1'. The locking elements 11 are advantageously configured to cooperate with openings in the plate 31 of the bearing 3 and in an element of the motor vehicle in order to fix the plate 31 to the motor vehicle. The locking element 11 once removed can therefore be used to enable the linkage 2 to be fixed to the motor vehicle in such a manner as to limit the waste to be processed linked to fixing the linkage 2 on the motor vehicle.

The various embodiments described above are examples provided by way of nonlimiting illustration. In fact, it is entirely possible for the person skilled in the art to modify the disposition of the locking elements 11 on the linkage 2 without departing from the context of the present description, the first ends 11a can for example be disposed facing the link 9. Moreover, the person skilled in the art could replace the locking nut described above with reference to the third variant of the second particular embodiment by any means for locking the second end 11b of the locking element 11.

Reversibly holding a linkage 2 in place in a transport position is therefore possible thanks to the locking element 11 described above. Installing and removing the locking element 11 are advantageously possible in a simple and easy manner and without necessarily needing tools. Moreover, the possibility of using the locking element 11 to fix the linkage 2 to the motor vehicle enables limitation of the waste to be processed linked to the installation and to the transportation of the linkage 2.

The invention claimed is:

1. A subassembly of a linkage of a wiper mechanism comprising:
   a bearing;
   a crank articulated on the bearing having a first end connected to the bearing and a second end including a ball joint;
   a link one end of which is connected by the ball joint to the crank,
   wherein at least the crank includes a first through-opening; and
   a locking element positioned in the first through-opening and configured to block the relative movement between the link and the crank.

2. The subassembly according to claim 1, wherein the first through-opening has a circular shape and wherein—the locking element has a cylindrical shape.

3. The subassembly according to claim 1, wherein the locking element corresponds to a locking screw, said locking element having a first end including a screw head, a free second end, and an externally threaded cylindrical shaft connecting the first end and the second end.

4. The subassembly according to claim 3, wherein the first through-opening is internally threaded so as to cooperate with the externally threaded cylindrical shaft of the locking element.

5. The subassembly according to claim 3, wherein the second end of the locking element passes through a second circular, through-opening in the link when the linkage subassembly is in the transport position.

6. The subassembly according to claim 5, wherein the first through-opening of the crank is internally threaded.

7. The subassembly according to claim 5, wherein the second through-opening in the link is internally threaded.

8. The subassembly according to claim 5, further comprising a nut for locking the second end of the locking element, said locking nut being intended to be fixed at the second end of the locking element passing through the link so as to hold the linkage subassembly in place in the transport position.

9. The subassembly according to claim 1, wherein the second end of the locking element comes into contact with a face of the link disposed facing the crank when the linkage subassembly is in the transport position.

10. The subassembly according to claim 9, wherein the link corresponds to a U-section and the second end of the locking element comes to be housed inside the U-section when the linkage subassembly is in the transport position.

11. The subassembly according to claim 10, wherein the link has inside the U-section a shape complementary to the second end of the locking element, said complementary shape being intended to cooperate with the free second end of the locking element, said complementary shape being internally threaded in order to hold the linkage subassembly in place in the transport position.

12. A linkage of a wiper mechanism, comprising:
   a first subassembly; and
   a second subassembly interconnected to the first subassembly by a link
   wherein the first subassembly or the second subassembly is a subassembly according to claim 1, said first subassembly and said second subassembly locked in the transport position of the linkage with the aid of the locking element.

13. A method according to claim 1 of locking a link and a crank of a linkage subassembly in a transport position, the method comprising:
   (a) inserting the locking element in the crank so that the first end faces a face of the crank opposite that facing the link;
   (b) rotating the link about the ball joint so as to move the linkage into the transport position; and
   (c) positioning the locking element by screwing, so that the free second end is at least in contact with the link.

* * * * *